Nov. 6, 1923.  M. HALLANAN  1,473,425
NONSKID DEVICE FOR TIRES
Filed Nov. 27, 1922
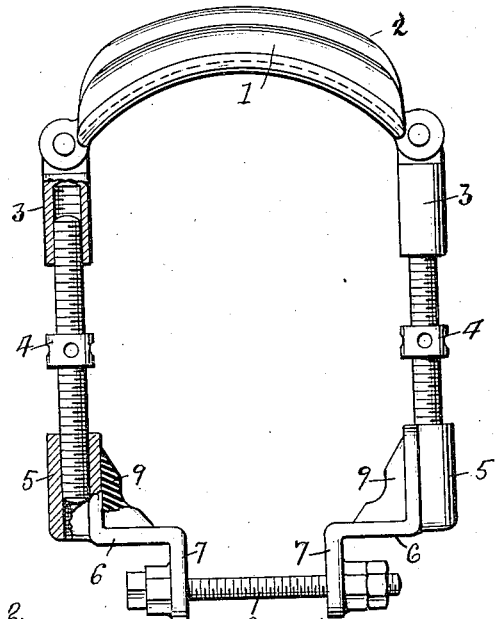
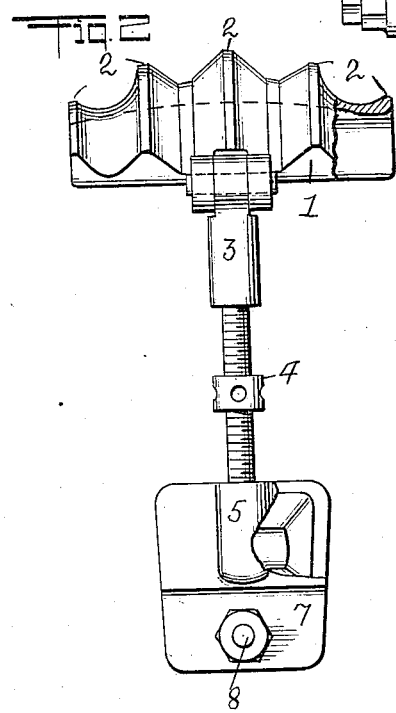
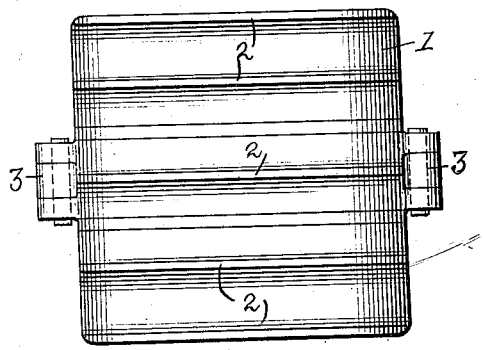
INVENTOR
Michael Hallanan,
BY his
Robert B. Killgore
ATTORNEY
WITNESS
M. E. Lessin Patented Nov. 6, 1923.

1,473,425

UNITED STATES PATENT OFFICE.

MICHAEL HALLANAN, OF NEW YORK, N. Y.

NONSKID DEVICE FOR TIRES.

Application filed November 27, 1922. Serial No. 603,635.

*To all whom it may concern:*

Be it known that I, MICHAEL HALLANAN, a citizen of the United States, residing at New York city, in the county of New York and State of New York, have invented certain new and useful Improvements in Nonskid Devices for Tires, of which the following is a specification.

My invention relates to non-skid traction devices for tires and it is my object to produce a device which can be easily applied to and removed from tires, especially of the pneumatic type, which will fit tires and rims of different sizes and which will be rigidly held in place on the tire.

In the drawing Fig. 1 is an end view of my device, partly in section; Fig. 2 a side view of the structure of Fig. 1, partly in section; and Fig. 3 a top view of the non-skid traction plate.

The device comprises a non-skid traction plate 1 curved in both directions on its inner face to fit a tire. This plate is ribbed at 2—2—2, the ribs being graduated in height, the highest being at the middle part and the lowest at the ends so that the jar in passing over the roadway will be reduced to a minimum.

A sleeve 3 is pivoted to each side of the middle part of the plate 1 and receives one end of a turnbuckle 4.

Clamp plates 5—5 are entered onto the other ends of the turn buckles and have inwardly extending parts 6—6 and downwardly extending parts 7—7. A bolt 8 passes through the downwardly extending parts 7—7 to draw them together and elastic packing 9—9 may be placed in the angles to contact with a wheel felloe to prevent marring.

In use the bolt 8 is removed and the sleeves, turn-buckles and clamp plates swung out so that the plate 1 can be laid on the face of the tire. The clamp plates are then swung into contact with the felloe and the bolt 8 inserted and tightened up to lock the clamp plates to the felloe which is gripped between the elastic packing. The turn buckles are then tightened up to draw the plate 1 into solid contact with the tire tread whereupon the device is solidly locked to the tire and wheel.

As the device is rigid on the wheel instead of merely being strapped, as has heretofore been customary, it does not tend to work loose in use.

One or more of these devices can be quickly attached to each driving wheel without jacking it up and on slippery roads the traction resulting from the gripping of the ribs 2—2—2 will cause the car to be driven positively while the raised spots resulting from the presence of the device will at once check any tendency to side slip or skidding.

The turn buckles enable the device to be used on tires and wheels of different diameters while the clamp plates and bolt take care of felloes of different widths.

I claim:—

1. A non-skid traction device for tires comprising a rigid, ribbed plate, a pair of sleeves pivotally secured to the sides of said plate, a pair of clamp plates, turn-buckles engaging the sleeves and clamp plates and means for forcing the clamp plates together.

2. A non-skid traction device for tires comprising a rigid, ribbed plate, a pair of sleeves pivotally secured to the sides of said plate, a pair of clamp plates having inward projections, elastic packing in the angles thereof, turn buckles engaging the sleeves and clamp plates and means for forcing the clamp plates together.

3. A non-skid device for tires comprising a plate adapted to engage the tread of a tire, projections on the outer face of said plate, a pair of internally threaded sleeves pivotally secured to the sides of the plate, a pair of turn buckles one end of which engages the threaded sleeves, a pair of clamp plates internally threaded and engaging the other ends of the turnbuckles and having downward and inward extensions and a bolt passing through the downward extensions whereby the turnbuckles draw the plate into engagement with the tire tread and the bolt draws the clamp plates into engagement with the felloe.

In testimony whereof I have affixed my signature.

MICHAEL HALLANAN.